(12) United States Patent
Gerst, III et al.

(10) Patent No.: US 10,724,947 B2
(45) Date of Patent: Jul. 28, 2020

(54) SYSTEM AND METHOD FOR ACQUIRING IMAGES OF SURFACE TEXTURE

(71) Applicant: Cognex Corporation, Natick, MA (US)

(72) Inventors: Carl W. Gerst, III, Clifton Park, NY (US); Rene Delasauce, Aachen (DE); Laurens Nunnink, Simpleveld (NL); Esther Oteo Lozano, Aachen (DE)

(73) Assignee: Cognex Corporation, Natick, MA (US)

( * ) Notice: Subject to any disclaimer, the term of this patent is extended or adjusted under 35 U.S.C. 154(b) by 225 days.

(21) Appl. No.: 14/686,724

(22) Filed: Apr. 14, 2015

(65) Prior Publication Data

US 2016/0305871 A1 Oct. 20, 2016

(51) Int. Cl.
*G01N 21/47* (2006.01)
*G03B 15/03* (2006.01)
*G01N 21/88* (2006.01)
*G01N 21/86* (2006.01)
*G01N 21/89* (2006.01)
(Continued)

(52) U.S. Cl.
CPC ......... *G01N 21/4738* (2013.01); *G01N 21/86* (2013.01); *G01N 21/8806* (2013.01); *G01N 21/8901* (2013.01); *G02B 13/22* (2013.01); *G02B 13/24* (2013.01); *G02B 27/144* (2013.01); *G03B 15/03* (2013.01); *H04N 5/2254* (2013.01); *H04N 5/2354* (2013.01);
(Continued)

(58) Field of Classification Search
None
See application file for complete search history.

(56) References Cited

U.S. PATENT DOCUMENTS 5,619,031 A * 4/1997 Choate ................... B23Q 17/24
250/201.2
5,842,060 A 11/1998 White et al.
(Continued)

FOREIGN PATENT DOCUMENTS

CN 202975460 U 6/2013
EP 0933953 A1 8/1999

OTHER PUBLICATIONS

"Telecentric lenses achieve precise measurements", Vision Systems Design (Jul. 1, 2001) (accessed at https://www.vision-systems.conn/non-factory/scientific-industrial-research/article/16739021/telecentric-lenses-achieve-precise-measurements on May 22, 2019) (Year: 2001).*

*Primary Examiner* — Lindsay J Uhl
(74) *Attorney, Agent, or Firm* — Loginov & Associates, PLLC; William A. Loginov

(57) ABSTRACT

This invention provides a vision system camera assembly that includes an optics and illumination module that is removably attached thereto, and that is arranged to project illumination along an optical axis of the imager. This arrangement allows for short exposure time and a short working distance from an imaged scene/surface under inspection. A semi-reflecting mirror turns a structured illumination beam from an illumination axis onto the optical axis while allowing light from the imaged scene to pass through the mirror and into the imager optics. The front end of the module contains a collimating optics that causes a collimated beam from the mirror to strike the surface at various off-axis angles. The collimating optics can include a telecentric lens assembly that can comprise a pair of stacked lenses having a perimeter that is equal to or greater than the area of interest on the surface.

20 Claims, 9 Drawing Sheets

(51) Int. Cl.
*G02B 13/22* (2006.01)
*G02B 13/24* (2006.01)
*G02B 27/14* (2006.01)
*H04N 5/225* (2006.01)
*H04N 5/235* (2006.01)

(52) U.S. Cl.
CPC .............. *G01N 2021/8812* (2013.01); *G01N 2201/0245* (2013.01); *H04N 5/2256* (2013.01)

(56) References Cited

U.S. PATENT DOCUMENTS

| | | | |
|---|---|---|---|
| 5,880,772 A | 3/1999 | Kalnajs et al. | |
| 6,188,058 B1 | 2/2001 | Tullis | |
| 6,191,850 B1* | 2/2001 | Chiang | G01N 21/88 356/237.1 |
| 6,246,050 B1 | 6/2001 | Tullis et al. | |
| 6,332,092 B1 | 12/2001 | Deckert et al. | |
| 6,509,559 B1* | 1/2003 | Ulrich | G01B 11/25 250/237 G |
| 6,703,633 B2 | 3/2004 | Tullis | |
| 6,980,249 B2 | 12/2005 | Albertelli | |
| 7,773,070 B2 | 8/2010 | Trisnadi et al. | |
| 7,989,729 B1* | 8/2011 | Zhao | G01J 1/08 136/244 |
| 2003/0025918 A1* | 2/2003 | Watkins | G01N 21/9501 356/609 |
| 2004/0156043 A1* | 8/2004 | Toker | G01N 21/8806 356/237.1 |
| 2004/0165759 A1* | 8/2004 | Baldwin | G01N 21/8806 382/141 |
| 2005/0004956 A1 | 1/2005 | Pourdeyhini | |
| 2006/0012299 A1* | 1/2006 | Suehiro | H01L 33/20 313/512 |
| 2007/0009257 A1* | 1/2007 | Baldwin | G01N 21/47 396/439 |
| 2007/0031993 A1 | 2/2007 | Nemets et al. | |
| 2007/0147821 A1 | 6/2007 | Gaessler et al. | |
| 2007/0165208 A1* | 7/2007 | Cowburn | G03G 21/046 356/71 |
| 2010/0019157 A1* | 1/2010 | Furlan | G01N 21/6452 250/363.01 |
| 2010/0231894 A1 | 9/2010 | Becker | |
| 2017/0025149 A1* | 1/2017 | Ahner | G01N 21/8806 |

* cited by examiner

SYSTEM AND METHOD FOR ACQUIRING IMAGES OF SURFACE TEXTURE

FIELD OF THE INVENTION

This invention relates to machine vision systems and more particularly to cameras and illumination arrangements for use in acquiring images of a surface having information defined within a surface texture.

BACKGROUND OF THE INVENTION

Machine vision systems, also termed "vision systems" herein, are used to perform a variety of tasks in a manufacturing environment. In general, a vision system consists of one or more cameras with an image sensor (or "imager") that acquires grayscale or color images of a scene that contains an object under manufacture. Images of the object can be analyzed to provide data/information to users and associated manufacturing processes. The data produced by the image is typically analyzed and processed by the vision system in one or more vision system processors that can be purpose-built, or part of one or more software application(s) instantiated within a general purpose computer (e.g. a PC, laptop, tablet or smartphone). Some types of tasks performed by the vision system can include inspection of objects and surfaces on a moving conveyor or motion stage.

A particular challenge in acquiring and analyzing images of certain surface types—for example, the distribution of paper fibers on a region of a paper surface—is that acquiring images of such features of this type on a surface, at relatively high speed (short exposure time), is enhanced by direct illumination, high resolution, and a relatively short working distance. Providing all these aspects to a single vision system arrangement can be problematic.

SUMMARY OF THE INVENTION

This invention overcomes disadvantages of the prior art by providing a vision system camera assembly that includes an optics and illumination module that is removably attached thereto, and that is arranged to project illumination along an optical axis of the imager and imaging lens assembly. This arrangement allows for short exposure time and a short working distance from an imaged scene/surface under inspection. A semi-reflecting mirror turns a structured illumination beam from an illumination axis onto the optical axis while allowing light from the imaged scene to pass through the mirror and into the imager optics. The front end of the module contains a collimating optics that causes a collimated beam to strike the surface at various off-axis angles. The structured beam can be provided using an optical filter or mask that defines an intensity gradient. Alternatively, a gradient can be built into the illuminator. The collimating optics can comprise a pair of stacked lenses having a perimeter that is equal to or greater than the area of interest on the surface. The collimating optics can also be part of a telecentric lens assembly that projects and image onto an area sensor. The module housing includes an integral or unitary pod with the illumination element and associated heat sink assemblies. The illumination element can be one or more high-output (e.g. red) LED(s) with a lens assembly and parabolic reflector. The module housing can also include a shield that defines an opposite angle relative to the mirror and includes a light-absorbing coating (e.g. matte black) to absorb and/or redirect back scatter from the illumination element passing through the mirror, thereby preventing ghost images and other undesirable effects in the imager from stray light. Optionally, the module housing can include a low-angle illuminator to provide additional low-angle light to the imaged scene.

In an illustrative embodiment, a vision system for imaging a surface having a fiber-like texture is provided. The system includes a vision system camera with an imager and a camera lens assembly that projects light from the imaged surface onto the imager aligned along an optical axis. An illumination module is positioned between the imaged surface and the camera lens assembly. The illumination module defines (a) an illumination element, (b) a semi-reflective mirror that allows light from the imaged surface to pass therethrough and into the camera lens assembly, and that reflects light generated by the illumination element along an illumination axis onto the optical axis to project on the imaged scene, and, (c) a collimating optics assembly that collimates the light as it is projected onto the scene. The projected light defines, at least in part, a structured, off-axis light pattern. A telecentric lens assembly is located along the optical axis at a front of the module constructed and arranged to provide a short working distance between the vision system and the surface. Illustratively, a gradient-generating element generates an intensity gradient of light from the illumination element. Additionally, a diffuser can be constructed and arranged to diffuse the light predominantly in the direction perpendicular to the intensity gradient. Alternatively, a holographic element or Fresnel element projects an intensity gradient in a first direction onto a filter or diffuser and has diffusing properties in a second direction perpendicular to the first direction. Illustratively, a diffusive element can be located in front of the holographic or Fresnel element. The gradient-generating element can also comprise an optical filter and/or an array of variable intensity lighting elements. Illustratively, the illumination element can comprise at least one high power LED. A heat sink can be operatively connected to the illumination element and supported by a housing of the module. The heat sink can include fins that facilitate air exchange or similar structures. The telecentric lens assembly can comprise at least two stacked lenses. The optical filter can be located approximately at the focal point along the illumination axis of the telecentric lens assembly. Illustratively, the illumination element can be located in a housing defining a pod arranged to be mounted to the lens end of the vision system camera assembly. The housing can have mounting elements that enable the pod to be supported in a predetermined orientation with respect to the surface, with the camera attached to and supported by the pod. Additionally, the illumination element can be oriented at an offset from an illumination axis to provide a gradient illumination onto the filter or diffuser. The module can also have an angled back shield aligned with respect to the illumination axis that absorbs light passing through the semi-reflective mirror. In embodiments, the system can further comprise an additional low-angle illumination element that projects low-angle illumination onto the surface. By way of non-limiting example, the fiber-like texture defines a feature to be recognized by the vision system with a recognition process, and/the surface can define paper packaging.

BRIEF DESCRIPTION OF THE DRAWINGS

The invention description below refers to the accompanying drawings, of which.

DETAILED DESCRIPTION

Figure 1:
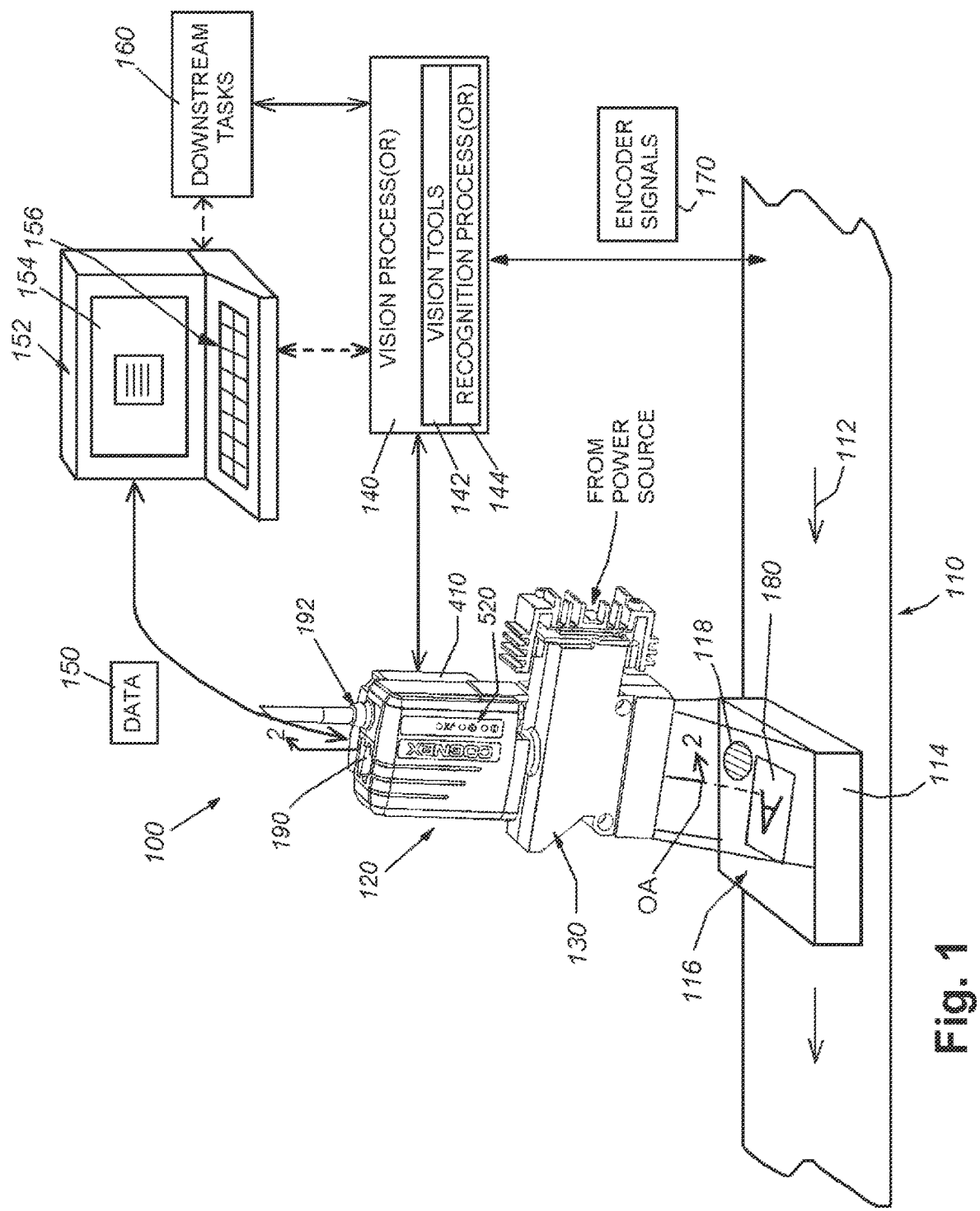
FIG. 1 is a diagram of a vision system for acquiring images of a an object at short working distances with direct illumination according to an illustrative embodiment.

FIG. 1 shows a machine vision system (also termed herein a "vision system") arrangement 100 positioned with respect to a conveyor assembly 110 or other motion staging mechanism. The conveyor 110 moves (arrow 112) to place objects (for example, a package) 114 into the field of view (FOV) of a vision system camera assembly 120. The FOV is at least large enough to capture relevant regions of the surface 116 of the object 114. The region in this example includes an area of interest 118 containing (e.g.) an inherent arrangement of (e.g. paper) fibers. Such fibers can serve as a fingerprint for the package, and can be imaged and stored for later identification by a vision system. In this manner, the fibers can act as a security mark on the package, which can be utilized to ensure it is not a counterfeit good. These fibers can be arranged to form a predetermined pattern that can be difficult to read under normal lighting and viewing conditions. The camera assembly 120, thus, includes an illumination and optics module 130 that provides direct illumination on the surface in the footprint of the FOV and along the camera optical axis OA. The construction and function of the module 130 is described in further detail below.

The vision system camera 120 in this embodiment can include an on-board vision processor 140 that performs vision system processes using vision system software and/or tools 142, such as those available from Cognex Corporation of Natick, Mass. These tools can include various pattern recognition tools/processes 144 that can be used to compare an acquired image to a model image, and/or employ various decoding processes (e.g. barcode decoders, OCR readers, etc.). The processor can reside fully in the camera housing and deliver processed image data 150 (e.g. codes, successful/unsuccessful identification, etc.) to a data-handling device, such as a standalone PC, server, laptop, smartphone or other general purpose computing device 152 with associated display 154 and user interface 156, or a purpose-built data handling device. This data 150 can be used by downstream data-handling processes to perform associated tasks 160, such as part acceptance/rejection, logistics, etc. Alternatively, some or all of the image processing can be performed by software instantiated within the computing device 152 and interoperating with an appropriate operating system.

Optionally, the conveyor 110 can provide motion-tracking signals 170 via an encoder or other motion-sensing device (e.g. a light curtain, part detector, etc.) to the vision system processor 140. Registering motion can assist in acquiring images of the area of interest 118 as it is expected to move into the FOV. Other processes such as rough pattern recognition (using, for example, a vision detector such as the Checker system, available from Cognex Corporation that identifies presence of a visible feature (e.g. a logo 180) on the surface 116.

Figure 2:
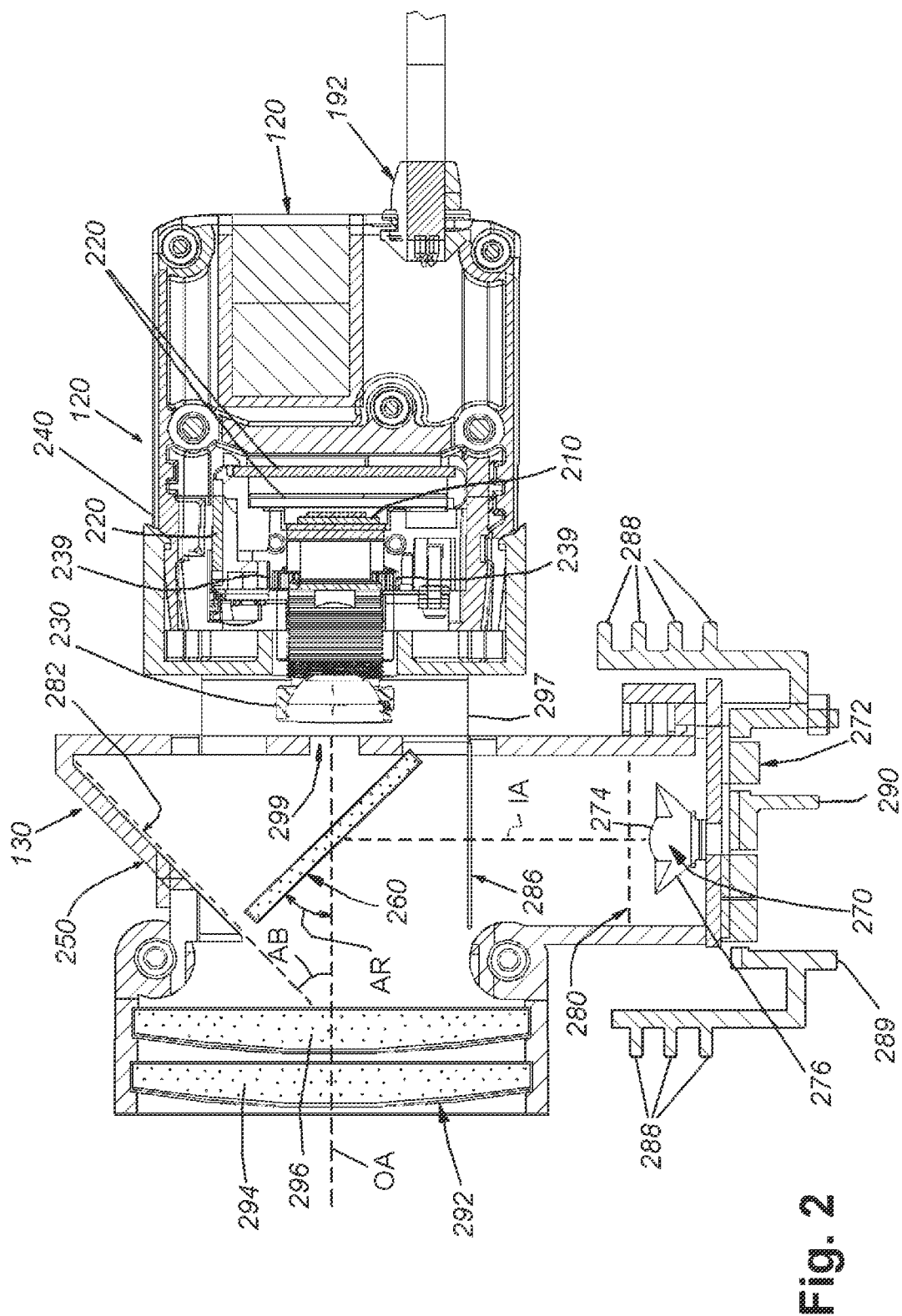
FIG. 2 is a side cross section of the vision system camera and illumination arrangement of the system taken along line 2-2 FIG. 1.
Figure 3:
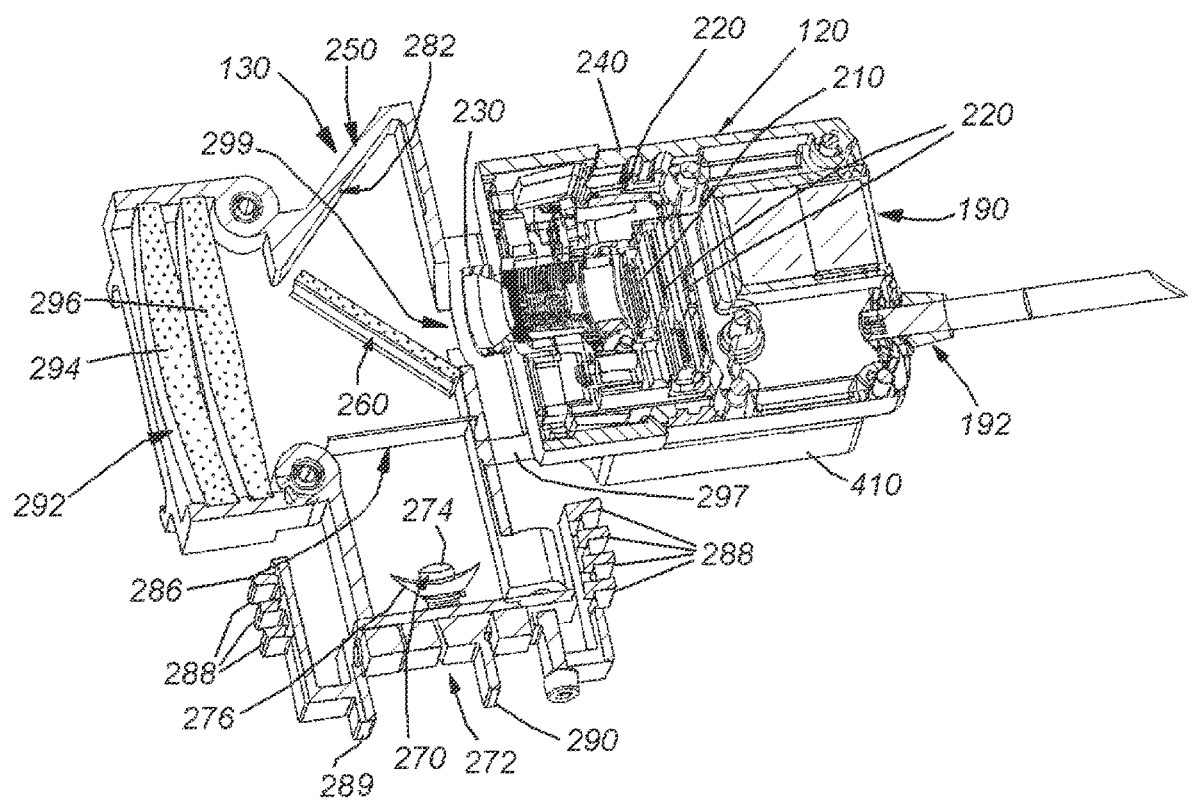
FIG. 3 is a perspective view of the side cross section of the vision system camera and illumination arrangement of FIG. 2.

With further reference to FIGS. 2 and 3, the camera assembly 120 includes an image sensor (or "imager") 210 that is part of a processor arrangement 220 located on a plurality of stacked circuit boards. In an embodiment the imager can comprise a CMOS sensor with a pixel array having a size of, for example, 752×480 pixels. This is exemplary of a range of possible sensor sizes including, but not limited to (e.g.) a 1280×960 pixel array. The specific arrangement and function of the processing components is highly variable in various embodiments. In general, the processing components/circuits 220 are responsible for controlling image acquisition by the image sensor 210 and illumination of the scene by the optics and illumination module (as well as any external illuminators as described below). The processing components/circuits also perform some or all of the image-processing and vision system functions as described generally above. Other circuits perform power handling and distribution (interfacing with power cord 192), as well as networked data communications (e.g. wirelessly or by a LAN connection using connection socket 190 (FIG. 1)) in a manner clear to those of skill.

Note, as used herein the terms "process" and/or "processor" should be taken broadly to include a variety of electronic hardware and/or software based functions and components. Also, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software.

The camera assembly includes a fixed lens assembly 230 that is threaded (for example with M12×0.5 mm thread) into the housing 240 so as to define a desired focal distance relative to the imaged scene. The distance between the lens pair 292 and the lens 230 has been chosen in such way, that the aperture stop of lens assembly 230 coincides with the Back Focal Point of the lens pair 292. This so-called "telecentric system" illustratively images an area of the surface 116 that is approximately 16×10 millimeters at the defined working distance. Notably, the working distance in this example is defined between approximately 10 and 30 millimeters with a typical distance of approximately 19-22 millimeters (less than an inch), measured from the front side of lens 294. This resolution is sufficient to adequately image (for recognition and analysis purposes) fibers in a paper substrate. As shown, the image sensor 210 and associated lens assembly 230 defines an optical axis OA that comprises the center or the FOV.

Note that the threaded base of the lens assembly 230 can be (optionally) rotatable using a drive gear assembly 239 or another appropriate motor-driven arrangement. The rotation of the threaded base causes the lens to move axially toward and away from the sensor to provide an auto-focus function to the camera assembly. Focus on an imaged subject can be attained using a variety of manual and/or automated techniques known to those of skill, and/or instantiated in the vision system process(or) 140. Alternatively, the system can be focused by moving the sensor axially toward or away from the object.

Figure 4:
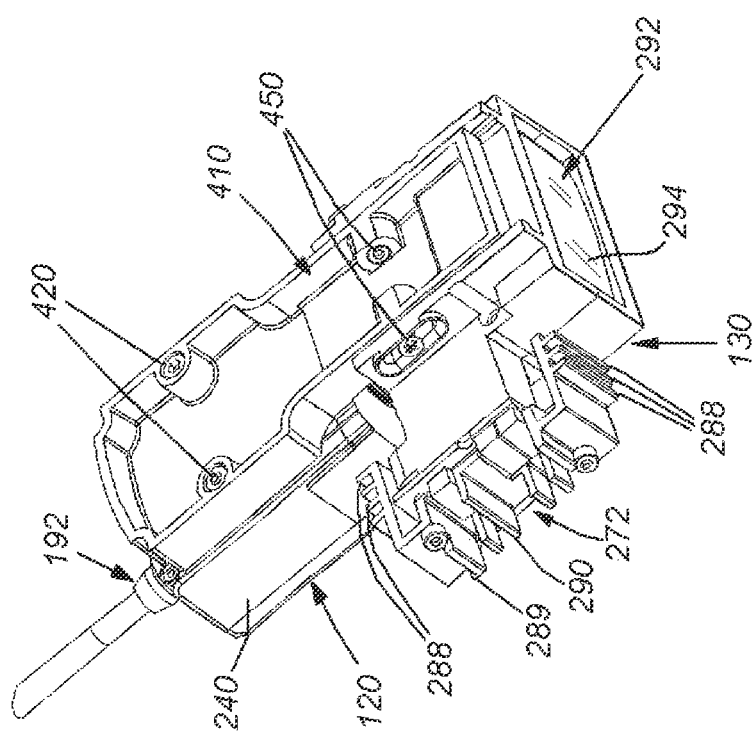
FIG. 4 is a bottom-oriented perspective view of the vision system camera and illumination arrangement of FIG. 2.

With reference also to FIG. 4, the illumination and optics module 130 is removably attached as an optional accessory to the camera 120 via a frame member 410, which is secured by fasteners 420 along a bottom side of the camera assembly housing 240. It can include mounting structures with appropriate fasteners 450 to engage mounting of the overall unit to an appropriate bracket in a work area. The module 130 consists of a housing 250 that contains a semi-reflecting mirror 260 defining a reflecting plane disposed at a 45-degree angle AR, with respect to the optical axis OA. A high-output illumination element 270, consisting of (e.g.) one or more LEDs is located within a pod 272 that extends at a right angle from the optical axis OA. The illumination element projects light generally along an illumination axis IA, which constitutes a right-angle extension of the direction of the optical axis OA (between the imager and object), until it strikes the semi-reflecting mirror 260, which acts as a beam splitter, redirecting a percentage of the light (e.g. 50%) onto the optical axis, to be output to the imaged scene (surface 116). The module housing 250 includes a back shield having a matte black reflecting surface (dashed line 282). The surface 282 is oriented at an opposing 90-degree angle with respect to the mirror reflective surface 260 as shown. Thus, any light passing through the mirror 260 is effectively absorbed by the surface 282, preventing ghost images and back scatter. The angle and/or surface finish of the back shield is highly variable with the general purpose of absorbing stray light that is not otherwise redirected along the optical axis.

Figure 2A:
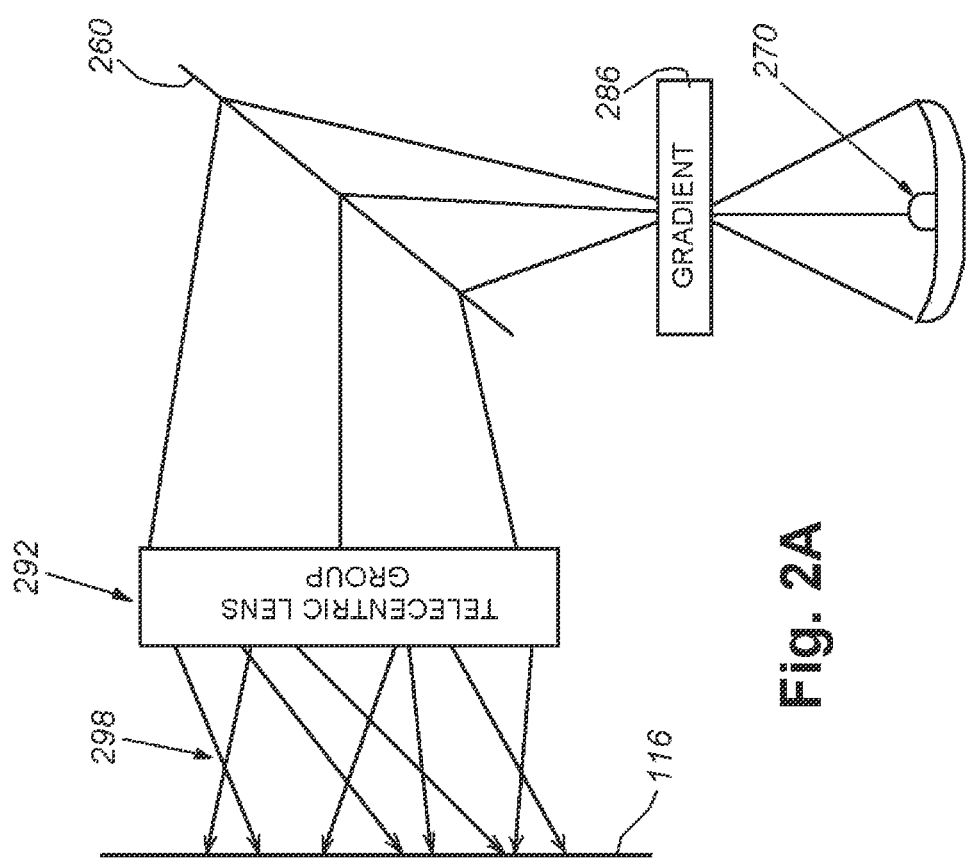
FIG. 2A is a schematic diagram of the projection of a gradient-filtered light through the beam-splitting mirror and telecentric lens group by the illumination arrangement of FIG. 2 onto an exemplary surface.

The illumination element 270 includes a diffusive lens 274 and a hemispherical or parabolic reflector 276. The light output is energized by a power source (FIG. 1) that can be operatively connected to an appropriate socket (e.g. 510 in FIG. 5) on the camera housing 240 or an external connector (not shown). Appropriate drivers and associated circuitry can be employed to drive the LEDs. Power is applied at least during image acquisition, and potentially on a continuous or semi-continuous basis during runtime. The LEDs in the illumination element 270 can output light in red, green, blue, yellow, white, or a combination of, wavelengths (colors). Illustratively, red, high-output LEDs are employed. An optional mask and/or diffuser 280 (shown in phantom) can be used to control light distribution. A mask and/or diffuser (filter) can be additionally, or alternately, provided at the location/plane 286, at or proximate to the focal point (plane 286) of the lens group 292. The diffuser can include a gradient coating that changes the intensity of light across the surface. The lens group 292 converts the gradient-filtered lighting into a ray pattern 298 exhibiting varying angles (see FIG. 2A). This facilitates the generation of a structured lighting pattern on the surface that facilitates imaging of fibers by providing light from a variety of angles (i.e. off-axis illumination).

In a further alternate arrangement, the illumination element 270 can be constructed as an array that generates a gradient effect through selective placement on the surface of LEDs representing a variety of intensities, thereby generating a gradient pattern at the source. This can also be accomplished through the use of individual, discrete lenses over each of LEDs.

The pod 272 in which illumination element 270 defines a heat sink with appropriate fins (or other structures) 288, 289 and 290 that increases overall surface area of the structure to enhance heat transfer from the illumination element 270 to the ambient environment via conduction and convection. The module heat sink pod 272 and overall module housing 250, in whole or in part, can be constructed from a heat-conductive material, such as aluminum alloy. Likewise, the housing 240 of the camera assembly can be constructed from appropriate materials, including heat-transmissive materials, such as aluminum alloy.

The module housing 250 includes a port 299 through which light from the module passes into the lens assembly 230. The interface between the module housing 250 and camera housing 240 can be illustratively covered by a cylindrical shroud 297.

Figure 5:
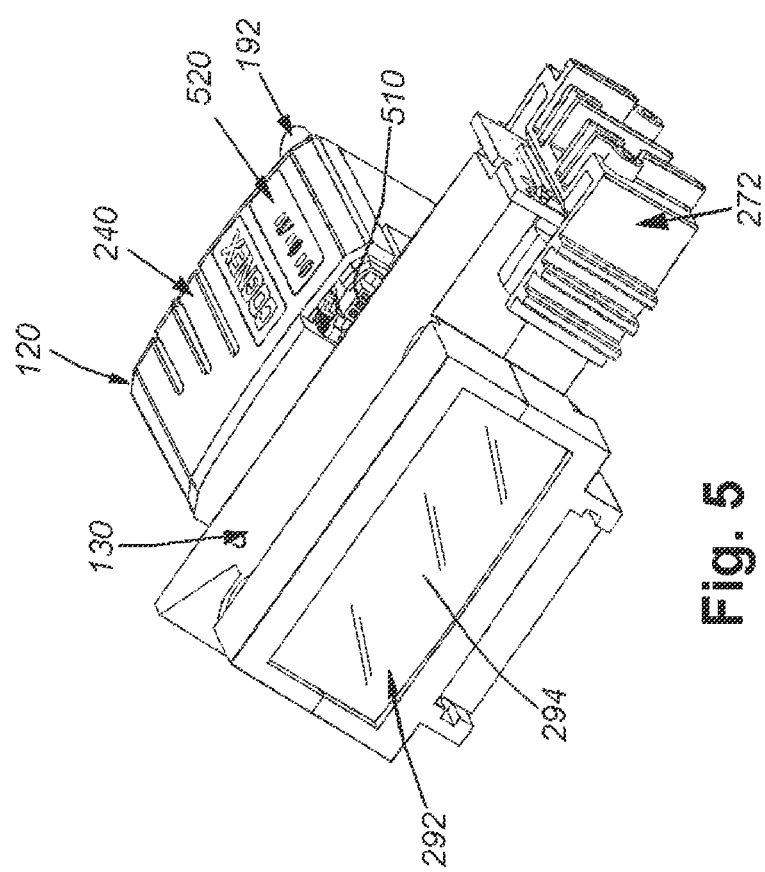
FIG. 5 is a front-oriented perspective view of the vision system camera and illumination arrangement of FIG. 2.

With reference also to FIG. 5, the module housing 250 supports a lens group 292 having a pair of stacked lenses 294 and 296 arranged along the optical axis OA. As described above, these lenses have a rectangular outline as depicted in FIGS. 4 and 5. The individual plano-convex lenses 294 and 296 illustratively have a 105-millimeter focal length, and are spaced apart axially by approximately 1 millimeter. The lenses 294, 296 are positioned so that their back focal point is coincident with the aperture stop of lens 230. In this way, lenses 294, 296 and 230 define an overall lens assembly that is telecentric on the object side. The arrangement of lenses serves to generate the above-described structured lighting pattern and also serves to collimate the light at the surface within the FOV. It should be clear that this combination of optical and illumination elements, thus, enables a shorter working distance useful for recognition and analysis of fine features, such as fibers embedded in a (e.g.) paper substrate. The magnitude of direct illumination projected onto the surface also enables short exposure times, desirable for use in a moving line—for example exposure times of less than 50 microseconds, and typically, approximately 30 microseconds. By way of non-limiting example, the camera assembly housing 240 includes a user interface panel 520 that can include various power, status and alarm/alert lights, as well as control (e.g. on/off buttons).

Note that the illumination filter and/or diffuser (286, etc.) can be oriented generally at a plane perpendicular to the optical/illumination axis (IA/OA), and that contains the back focal point of the (e.g.) front lens assembly 292. Desirably, the filter has a transmission gradient in one direction and a constant transmission characteristic in the direction perpendicular to the first direction. The diffuser is constructed and arranged to predominantly diffuse the light in the direction perpendicular to the gradient direction. An exemplary and suitable type of diffuser for use with an embodiment herein is the (60°×10°) holographic diffuser commercially available (e.g.) from Luminit, LLC of Torrance, Calif. Alternatively, instead of the combination of gradient filter and diffuser, a commercially available holographic filter or Fresnel element can be used together with a diffuser with similar properties. In another embodiment, to generate the intensity gradient at plane 286, the light source (e.g. a high-power LED or row/grouping of lower-power LEDs) can be positioned off-axis (i.e. displaced from the illumination axis IA)

Figure 6:
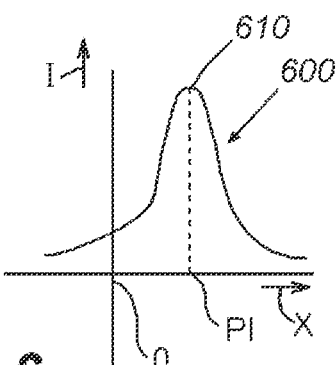
FIG. 6 is a graph of illumination intensity distribution versus offset from of the illumination and optical axis where the illumination arrangement includes and offset illumination source, in an embodiment.
Figure 7:
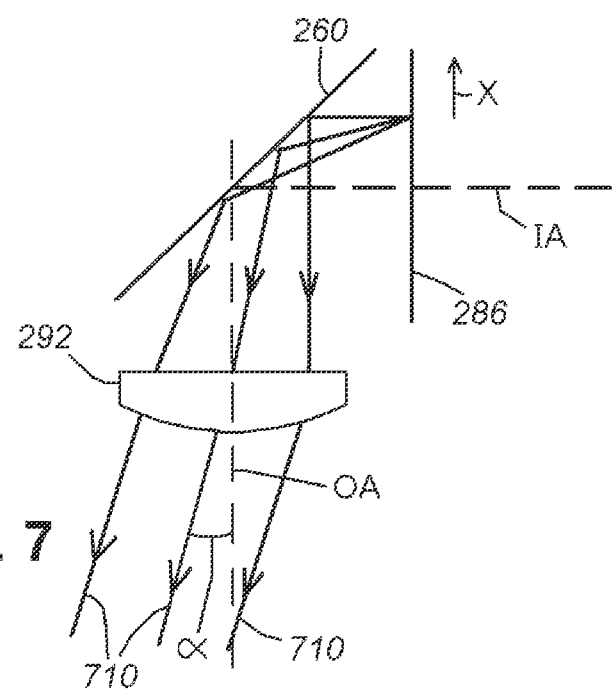
FIG. 7 is a diagram of the angular offset of illumination light rays onto a surface where the illumination source is offset in accordance with FIG. 6.
Figure 8:
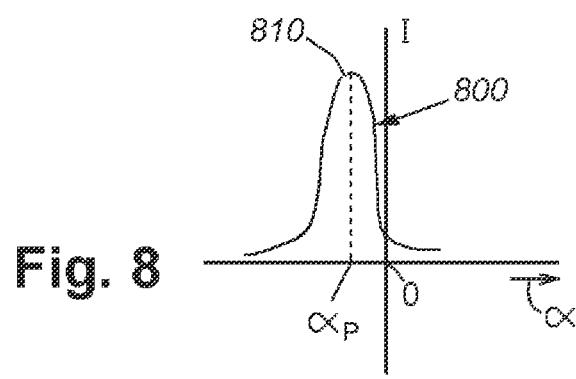
FIG. 8 is a graph of illumination intensity versus angle in the illustrative arrangement of FIGS. 6 and 7.

As shown in FIG. 6, the plot 600 of light intensity I versus displacement x from the illumination axis indicates peak intensity 610 at a point PI that is remote from the axis (origin 0). Referring to FIG. 7, because the plane 286 resides within the focal point of the lens 292, each point of in this plane 286 corresponds to a direction of the collimated light (angle α with the illumination/optical axis IA). In this example, the origin of the light is displaced along the plane 286 from the axis IA by displacement x. Thus, the object is illuminated by light rays 710 with an asymmetric angular distribution as shown. When illuminating a textured surface, the amount of reflected light redirected back towards the camera will strongly depend on the local direction(s) of the object surface, and therefore the contrast of the image of such surface will be increased. The typical intensity I versus angle distribution α curve of the collimated light is shown in FIG. 8 below. Note the peak 810 of the intensity distribution 800 is slightly off-axis from 0 degrees at angle αp. The value for αp can be approximately 1-7 degrees in an exemplary arrangement.

Figure 9:
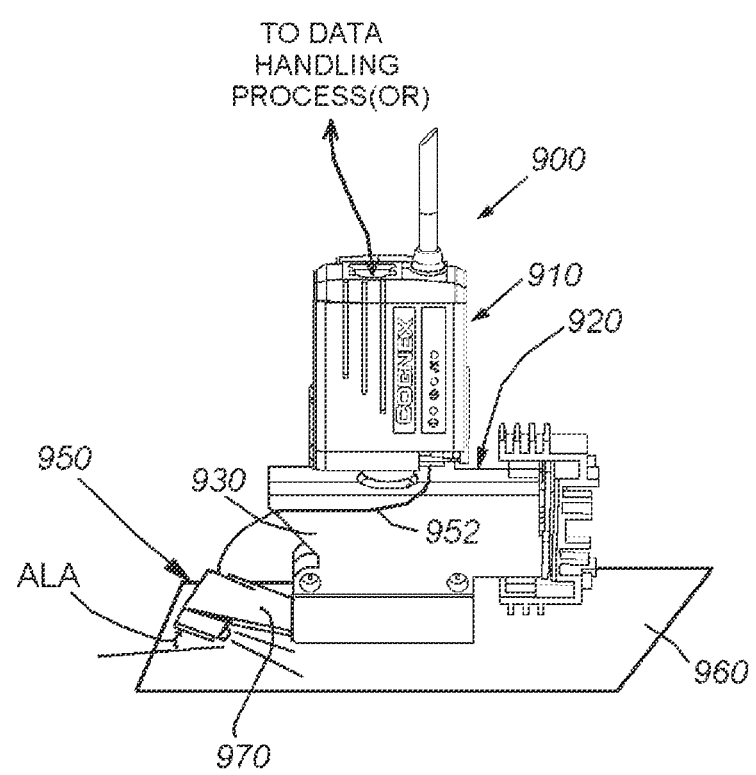
FIG. 9 is a diagram of a vision system camera and illumination arrangement according to an alternate embodiment in which an optional low-angle illumination module illuminating an exemplary surface.

Reference is now made to FIG. 9, which shows a vision system 900, consisting of a camera assembly 910 with an optics and illumination module 920 similar or identical in structure and function to that described above. The module housing 930, or another structure associated with the camera assembly 910, supports a supplemental illumination element 950. The element can be powered by an external source or by interface with an appropriate cable 952 and connector on the camera housing. In this embodiment, the illumination element is arranged to project a light at a low angle ALA with respect to the subject surface 960. In an embodiment the light is approximately 10-25 degrees, and typically approximately 18 degrees. The bracket or mount 970, as well as its location with respect to the module housing or camera, is highly variable. In general, the use of low-angle light (e.g. generated by red-wavelength, or another color-wavelength, LED) supplements the direct light projected through the collimating, telecentric lens assembly of the module.

Figure 10:
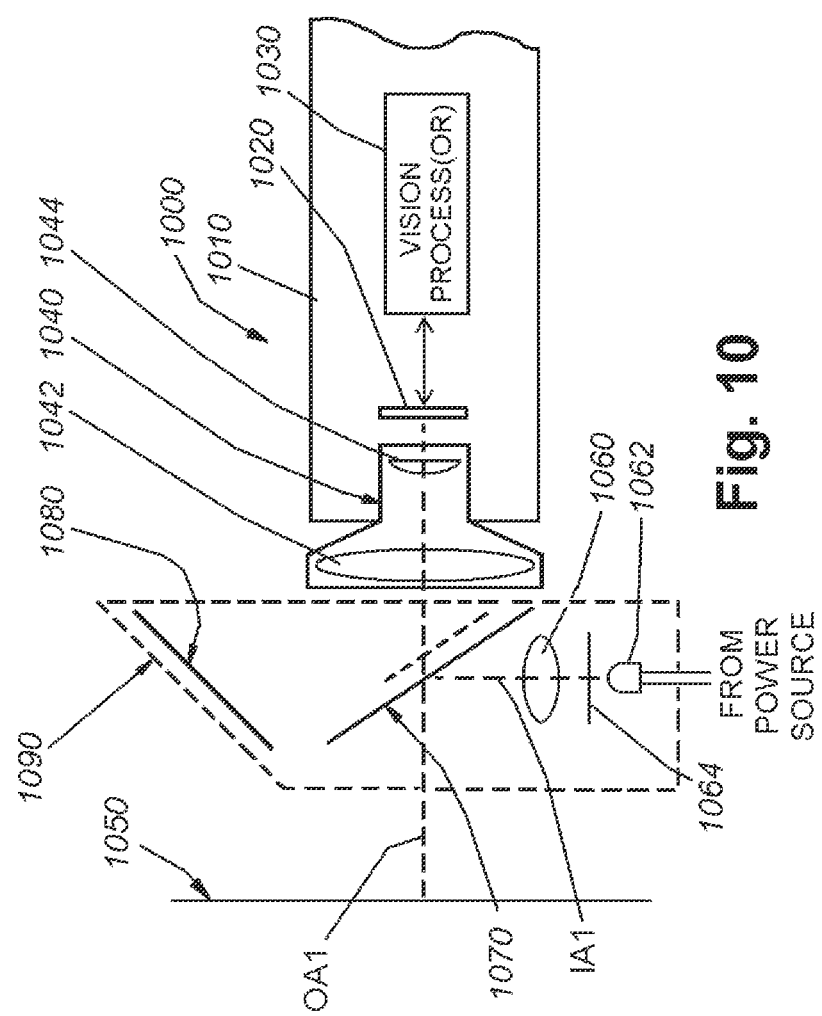
FIG. 10 is a schematic diagram of a vision system camera lens and illumination arrangement according to another alternate embodiment.

FIG. 10 is a schematic diagram of an alternate arrangement 1000 for a vision system to achieve direct illumination and short working distance according to an embodiment. The camera assembly 1010 consists of an imager 1020 and associated vision processor 1030, as described above. A fixed or variable lens assembly 1040 is provided, via a conventional mounting arrangement, to the camera housing.

Illustratively, the camera lens assembly 1040 contains a telecentric lens assembly 1042 and associated optics 1044 to focus light from the scene 1050 onto the imager 1044 along the optical axis OA1. A separate lens assembly 760 is arranged along the illumination axis IA1, which is aligned at a right angle to the optical axis OA1. This lens assembly 1060 collimates the light from the illumination element 1062. This light can pass through a filter and/or mask 1064 to structure the light based upon a gradient coating, or such gradient can be provided directly to the light source 1062. Illustratively, the mask or filter is positioned near the Back Focal Point of lens 1060. However a variety of placements are contemplated in alternate arrangements. The light is reflected onto the optical axis OA1 from the illumination axis IA1 via the semi-reflective mirror 1070. This mirror 1070 acts as a beam splitter in that it also allows image light to pass from the scene 1050 to the lens assembly 1040 and imager 1020. Back scatter that passes through the mirror 1070 from the illumination element 1062 is absorbed by an angled back shield 1080 with an appropriate light-absorbing (e.g. matt black) coating as described generally above. All components can be contained within a module housing 1090 (shown in phantom) that removably interconnects with the camera 1010 as an accessory. Likewise, the lens assembly 1040 can be provided as part of the accessory package.

It should be clear that the vision system camera assembly and associated optics and illumination module allows for effective illumination and imaging of certain challenging surfaces, such as embedded fibers in a substrate. The module can be provided as an accessory to a standard vision system camera assembly increasing the versatility of such a system.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while imaging and analysis of fibers in a (e.g.) paper substrate is an exemplary application for the arrangement described herein, it is contemplated that this illustrative vision system arrangement can be used in conjunction with any surface that is appropriately imaged at a short working distance. For example, surfaces in which grain boundaries are to be resolved, and/or surfaces subject to micro-cracks. The variable-focus lens can be arranged using a mechanically actuated lens as depicted or another technology—example a membrane-based or iso-density-fluid-based lens structure (available, respectively from Varioptic of France or Optotune of Switzerland). Likewise, the illumination element and/or low-angle light component can be arranged to transmit some or all transmitted light in a near-visible wavelength (e.g. IR or UV) where appropriate to image the subject. Accordingly, this description is meant to be taken only by way of example, and not to otherwise limit the scope of this invention.

What is claimed is:

1. A vision system for imaging a surface having a fiber-like texture comprising:
    a vision system camera with an imager and a camera lens assembly that projects light from the imaged surface onto the imager aligned along an optical axis; and
    an illumination module positioned between the imaged surface and the camera lens assembly, the illumination module having,
    (a) an illumination element,
    (b) a semi-reflective mirror that allows light from the images surface to pass therethrough and into the camera lens assembly and that reflects light generated by the illumination element along an illumination axis onto the optical axis to project on the imaged scene, and (c) a telecentric lens assembly having a back focal point that coincides with an aperture stop of the camera lens assembly and that collimates the light as it is projected onto the scene, the projected light from the telecentric lens assembly to the surface defining, a structured, off-axis light pattern at a plurality of angles, the telecentric lens assembly being located along the optical axis to provide a predetermined working distance between the vision system and the surface.

2. The vision system as set forth in claim 1 further comprising a gradient-generating element that generates an intensity gradient of light from the illumination element.

3. The vision system as set forth in claim 2 further comprising a diffuser constructed and arranged to diffuse a majority of the light in the direction perpendicular to the intensity gradient.

4. The vision system as set forth in claim 1 further comprising a holographic element or Fresnel element that generates an intensity gradient in a first direction and that has diffusing properties in a second direction perpendicular to the first direction.

5. The vision system as set forth in claim 4 further comprising a diffusive element disposed between the holographic or Fresnel element and the illumination element.

6. The vision system as set forth in claim 2 wherein the gradient-generating element comprises at least one of an optical filter and an array of variable intensity lighting elements.

7. The vision system as set forth in claim 1 wherein the illumination element comprises at least one LED and further comprising a heat sink operatively connected to the illumination element and supported by a housing of the module.

8. The vision system as set forth in claim 7 wherein the heat sink includes fins that facilitate air exchange.

9. The vision system as set forth in claim 1 wherein the telecentric lens assembly comprises at least two stacked lenses.

10. The vision system as set forth in claim 6 wherein the optical filter is located proximate to the focal point along the illumination axis of the telecentric lens assembly.

11. The vision system as set forth in claim 1 further comprising a low-angle illumination element that projects low-angle illumination onto the surface at 10-25 degrees with respect to the surface.

12. The vision system as set forth in claim 1 wherein the illumination element is located in a housing defining a pod arranged to be mounted to the lens end of the vision system camera assembly.

13. The vision system as set forth in claim 12 wherein the housing has mounting elements that enable the pod to be supported in a predetermined orientation with respect to the surface with the camera attached to and supported by the pod.

14. The vision system as set forth in claim 1 wherein the illumination element is oriented at an offset from an illumination axis to provide off-axis illumination to the surface.

15. The vision system as set forth in claim 1 wherein the illumination module has an angled back shield aligned with respect to the illumination axis that absorbs light passing through the semi-reflective mirror.

16. The vision system as set forth in claim 1 wherein the fiber-like texture defines a feature to be recognized by the vision system with a recognition process.

17. The vision system as set forth in claim 16 wherein the surface defines paper packaging.

18. A vision system for imaging a surface having a fiber-like texture comprising:

a vision system camera with an imager and a camera lens assembly that projects light from the imaged surface onto the imager aligned along an optical axis; and an illumination module positioned between the imaged surface and the camera lens assembly, the illumination module having, (a) an illumination element, (b) a semi-reflective mirror that allows light from the images surface to pass therethrough and into the camera lens assembly and that reflects light generated by the illumination element along an illumination axis onto the optical axis to project on the imaged scene, and (c) a telecentric lens assembly having a back focal point that coincides with an aperture stop of the camera lens assembly and being located between the illumination source and the semi-reflective mirror that collimates the light as it is projected onto the scene, the projected light from the telecentric lens assembly to the surface defining, a structured, off-axis light pattern at a plurality of angles, the telecentric lens assembly being integrated with the camera lens to provide a predetermined working distance between the vision system and the surface, wherein the light source is offset from the illumination axis to generate off-axis lighting on the surface, and/or the vision system further comprising an angled back shield aligned with respect to the illumination axis that absorbs light passing through the semi-reflective mirror.

19. The vision system as set forth in claim 18 wherein the light source is offset from the illumination axis to generate off-axis lighting on the surface.

20. The vision system as set forth in claim 18 further comprising an angled back shield aligned with respect to the illumination axis that absorbs light passing through the semi-reflective mirror.

* * * * *